A. CASPER.
CONDUIT CONNECTION.
APPLICATION FILED APR. 17, 1917.
1,279,256.
Patented Sept. 17, 1918.
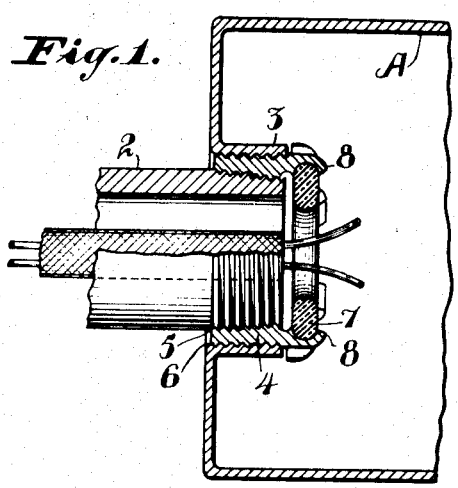
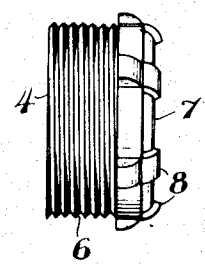
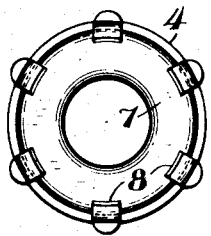
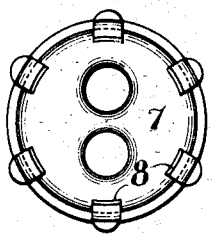
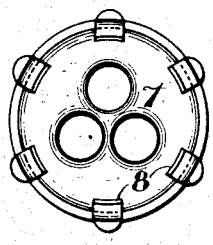
WITNESSES:
INVENTOR
Albert Casper
BY Strong & Townsend
ATTORNEYS

UNITED STATES PATENT OFFICE.

ALBERT CASPER, OF VALLEJO, CALIFORNIA, ASSIGNOR OF ONE-THIRD TO WILLIAM W. WEIR, OF VALLEJO, CALIFORNIA.

CONDUIT CONNECTION.

1,279,256.  Specification of Letters Patent.  Patented Sept. 17, 1918.

Application filed April 17, 1917. Serial No. 162,692.

*To all whom it may concern:*

Be it known that I, ALBERT CASPER, a citizen of the United States, residing at Vallejo, in the county of Solano and State of California, have invented new and useful Improvements in Conduit Connections, of which the following is a specification.

This invention relates to a conduit connection, and particularly to a bushing to be used in connection therewith.

One of the objects of the present invention is to provide a simple, cheaply manufactured easily applied conduit connection for pipe conduits, particularly such as are employed in carrying insulated wires to or from outdoor boxes, for instance, outlet boxes, service cans, switch cans, cabinet cans, switch-board cans, pull-in cans, or any other like device where a rigid, moisture-proof, grounded connection is required. Another object of the invention is to provide a device of the character described which can be readily connected without the use of locknuts, and the like, and which may also serve as a closure for knock-out openings. Another object of the invention is to provide means for supporting an insulating washer to permit separating of incoming or outgoing wires and to prevent grounding or short circuiting of the same. Further objects will hereinafter appear.

The invention consists of the parts and the construction and combination of parts as hereinafter more fully described and claimed, having reference to the accompanying drawings, in which—

Figure 1 is a side elevation, partly in section, showing the preferred form of conduit connection employed.

Fig. 2 is a side elevation of a bushing supporting an insulating ring.

Fig. 3 is a front view of Fig. 2.

Fig. 4 is a similar view, showing an insulating member in the form of a disk having two openings therein to permit separation of the incoming wires.

Fig. 5 is a front view, showing an insulating disk having three openings.

Fig. 6 shows a conduit opening provided with a knock-out disk.

Referring to the drawings in detail, A indicates the casing of an outlet box, service can, switch cabinet, or like device, which is provided with a suitable number of conduit openings or knock-outs to permit the box to be connected with pipe conduits, such as shown at 2, through which the incoming or outgoing wires are passed.

The present invention comprises the following construction: The metal forming the box, shown at A, is first cut out to form a circular opening, which is then expanded inwardly to form an annular shoulder 3. This shoulder is internally threaded by a tap to permit it to receive a bushing 4. This bushing is threaded both externally and internally, as shown at 5 and 6, respectively, and therefore serves three functions; first, it forms a positive bond or connection between the casing and the conduit pipe; second, it forms a threaded opening for the reception of the pipe; and, third, it serves as a holder and retainer for an insulating ring or disk 7 such as shown in Figs. 1, 3, 4 and 5. Standard pipe tap threads are preferably employed to form a tapering thread both in the annular shoulder and in the bushing. The bushing in this manner serves as a wedge or will, in other words, become slightly expanded from the inside by the pipe and slightly contracted from the outside by the annular, threaded shoulder. The importance of this construction can readily be seen as it permits the different threaded parts to be screwed home and a thorough bond connection produced.

The screwing of the bushing into position within the annular shoulder 3 and the insertion of a pipe is accomplished in one operation; that is, the pipe is first inserted in the opening within the annular shoulder in a position as concentric therewith as possible. The bushing is then inserted from the inside and as the threads will engage both the pipe and the annular flange, it can readily be seen that both connections are made at one time and that it will be impossible to remove the bushing from the exterior as the tapering pipe tap threads employed will not permit it.

The insulating ring or disk employed may be rigidly secured in the inner end of the bushing, if desired, but is preferably loosely and turnably mounted between a plurality of inwardly turned lugs 8, formed on the end of the bushing. These lugs may be cast integral with the bushing or separately secured and may, therefore, be bent over the insulating ring or disk to prevent its accidental removal when once inserted. The ring or disk may be constructed of porcelain, vulcanized rubber, fiber, or any other suitable material, and it may be provided with a single opening, as shown in Figs. 1 and 3, or with several openings, as shown in Figs. 4 and 5. This is of considerable importance as it permits separating of the wires at the point of admission to the box and it also holds the wires out of contact with any metal face, thus eliminating grounding or short circuiting of the current even though the wires should become chafed or the insulating covering partly removed.

The annular shoulder 3 may be provided with a recess 9, such as shown in Fig. 8, at its inner end for the reception of a knock-out disk 10 which serves to normally close the conduit opening when it is not required.

A conduit connection constructed as here shown is not only water and moisture-proof, but it makes it possible to form a more positive ground or bond between the box and the conduit than is otherwise the case. It is also a labor and material saver as it takes the place of the two lock-nuts and washers heretofore employed and it, furthermore, eliminates tampering without detection where sealed boxes or cabinets are employed.

The materials and finish of the several parts of the device are such as the experience and judgment of the manufacturer may dictate.

I wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is—

1. In combination with an outlet box having an opening and an integral interiorly threaded circular flange surrounding the opening, a bushing having interior threads to engage a pipe and having exterior threads engaging the threads of said flange, said bushing having a series of spaced integral fingers extending longitudinally thereof and disposed beyond the inner end of said flange and having curved inner seats, and an insulating ring supported at its periphery in said seats and having its inner circumference extending beyond the interior of the pipe so as to engage the conduit wires, the interior threaded bore of said bushing being tapered whereby when the pipe is screwed into the bushing the latter will be expanded.

2. In combination with an outlet box having an opening and an interiorly threaded flange surrounding same, a bushing exteriorly threaded and engaged with the threads of said flange and having interior threads to engage the pipe, the inner end of said bushing being formed with a series of spaced fingers extending longitudinally of the bushing and having seats on their inner faces, and an insulating ring supported at its periphery by said fingers so as to be disposed beyond the inner end of the pipe.

3. In combination with an outlet box having an opening and an integral interiorly threaded circular flange surrounding the opening, a bushing having interior threads to engage a pipe and having exterior threads engaging the threads of said flange, said bushing having a series of integral spaced fingers extending out from its inner end, and an insulating ring engaged at its periphery by said fingers and supported thereby, the interior threaded bore of said bushing being tapered whereby when the pipe is screwed into the bushing the latter will be expanded.

In testimony whereof I have hereunto set my hand in the presence of two subscribing witnesses.

ALBERT CASPER.

Witnesses:
JOHN H. HERRING,
W. W. HEALEY.